US007675905B2

(12) United States Patent
Delaney et al.

(10) Patent No.: US 7,675,905 B2
(45) Date of Patent: Mar. 9, 2010

(54) METHODS, SYSTEMS, AND COMPUTER PROGRAM PRODUCTS FOR SELECTIVELY PERFORMING GLOBAL TITLE TRANSLATION BASED ON MESSAGE TYPE

(75) Inventors: Robert J. Delaney, Raleigh, NC (US); Todd Eichler, Wake Forest, NC (US)

(73) Assignee: Tekelec, Morrisville, NC (US)

( * ) Notice: Subject to any disclaimer, the term of this patent is extended or adjusted under 35 U.S.C. 154(b) by 1237 days.

(21) Appl. No.: 11/104,189

(22) Filed: Apr. 12, 2005

(65) Prior Publication Data
US 2006/0227784 A1 Oct. 12, 2006

(51) Int. Cl.
| H04L 12/66 | (2006.01) |
| H04L 12/50 | (2006.01) |
| H04Q 11/00 | (2006.01) |
| H04M 7/00 | (2006.01) |

(52) U.S. Cl. .................. 370/352; 370/360; 370/385; 379/221.09; 379/230

(58) Field of Classification Search ........................ None
See application file for complete search history.

(56) References Cited

U.S. PATENT DOCUMENTS

| 5,953,404 | A | * | 9/1999 | Fikis et al. .................. 379/230 |
| 6,098,076 | A | | 8/2000 | Rekieta et al. |
| 6,101,494 | A | | 8/2000 | Khosravi-Sichani et al. |
| 6,108,409 | A | | 8/2000 | Cooper et al. |
| 6,230,164 | B1 | | 5/2001 | Rekieta et al. |
| 6,282,280 | B1 | | 8/2001 | Rekieta et al. |
| 6,577,723 | B1 | * | 6/2003 | Mooney ................. 379/221.08 |
| 6,611,533 | B1 | * | 8/2003 | Liao et al. .................... 370/467 |
| 6,795,546 | B2 | * | 9/2004 | Delaney et al. ............. 379/229 |
| 7,050,562 | B2 | | 5/2006 | Allison et al. |
| 2004/0096049 | A1 | | 5/2004 | Delaney et al. |
| 2004/0141493 | A1 | * | 7/2004 | Delaney et al. ............. 370/352 |
| 2005/0013290 | A1 | | 1/2005 | Allison et al. |

OTHER PUBLICATIONS

Notification of European Publication Number and Information on the Application of Article 67(3) EPC for European Application No. 04756298.8 (Mar. 1, 2006).
Notice of Allowance and Fee(s) Due for U.S. Appl. No. 10/878,171 (Dec. 21, 2005).
Notification of Transmittal of the International Search Report and the Written Opinion of the International Searching Authority, or the Declaration for International Application No. PCT/US 06/13405 (Aug. 29, 2007).

* cited by examiner

*Primary Examiner*—Daniel J. Ryman
*Assistant Examiner*—Cassandra Decker
(74) *Attorney, Agent, or Firm*—Jenkins, Wilson, Taylor & Hunt, P.A.

(57) ABSTRACT

Methods, systems, and computer program products are disclosed for selectively performing global title translation based on message type at an SS7 network node. A message is received indicating route-on-global-title. A message type of the received message is determined. Global title translation is selectively performed based on the determined message type.

26 Claims, 6 Drawing Sheets

METHODS, SYSTEMS, AND COMPUTER PROGRAM PRODUCTS FOR SELECTIVELY PERFORMING GLOBAL TITLE TRANSLATION BASED ON MESSAGE TYPE

TECHNICAL FIELD

The subject matter described herein relates to routing messages in a communications network. More particularly, the subject matter described herein relates to selectively performing global title translation based on message type.

BACKGROUND

In telecommunications signaling networks, global title translation (GTT) refers to the process by which the signaling connection control part (SCCP) called party address (CdPA) in a signaling message is translated into the point code of an intermediate or final destination. In intermediate global title translation, the SCCP CdPA is translated into the point code of an intermediate destination. In final global title translation, the SCCP CdPA is translated into the point code and subsystem number of a final destination.

A node that performs intermediate GTT translates the global title address (GTA) digits in the message to a point code corresponding to a second node and sends the message with a route-on-global-title indication to the second node. The first node may or may not modify the GTA digits before sending to the second node. The second node performs another global title translation, which could be another intermediate GTT, or a final GTT.

The node performing the final GTT translates the GTA digits in the message to the point code and subsystem number corresponding to the final destination node for the message. After translation, the node sends the message route-on-point-code-subsystem-number to the next hop in the routing path. The next hop in the routing path may or may not be the final destination. Although no subsequent GTTs will be performed, the message may be routed through several more nodes before reaching its final destination.

The transaction capabilities application part (TCAP) protocol is used in Signaling System 7 (SS7) telecommunications networks for sending database queries to a service control point (SCP). The SCP provides an interface to local and remote databases that contain subscriber and routing information. TCAP messages can also be sent from one voice switch to invoke functions in another switch in the network. When TCAP is used to query a database, SCCP may be used in conjunction with TCAP to route the message to the appropriate database subsystem.

In some telecommunications networks, SCPs are redundantly provided. That is, multiple identically provisioned SCPs may be present in a network for enhanced reliability and/or for increasing the speed at which SCP services are provided. Each of the redundant SCPs may have a separate point code, and other network nodes may rely on GTT translations to route messages to the SCPs. In such a case, most final GTT translations are performed such that messages will be distributed among redundant SCPs based on any suitable criteria, such as load sharing. Load sharing between redundant SCPs may be equal, for example, if the SCPs have identical processing capabilities. Alternatively, load sharing may be unequal, for example, if one SCP has greater relative processing capabilities. Another reason for unequal load distribution may include providing a high quality of service SCP for subscribers willing to pay for faster SCP access.

Regardless of the reason for distributing messages among redundant SCPs, there may be some cases in which it is desirable to ensure that a message is delivered to a particular SCP. More particularly, certain types of messages are handled more efficiently when sent to an SCP already involved in the associated transaction. For example, when a query is initiated by an SCP, a response to the query can be handled more efficiently if returned to the initiating SCP. Conventionally, however, there is no discrimination performed based upon the type of message being processed. For example, when load sharing is employed, the load sharing algorithm does not process messages differently based on whether the message is a response or another message type. Thus, a conventional GTT load sharing application could result in a message being sent to the incorrect SCP.

Some conventional approaches use a calling party address (CgPA) point code (PC) from a query message to return the response to the query back to the SCP originating the query. Not all network implementations, however, have a point code in the CgPA. Global System for Mobile Communications (GSM) implementations, for example, do not use a CgPA PC in order to provide space for other data. As a result, for GSM implementations, each transaction must be tracked using a transaction ID in the TCAP message to associate specific transactions with a particular SCP. This requires the use of a device that tracks the state of each transaction by transaction ID and associates it with an SCP until the entire transaction is completed.

Tracking individual transactions requires resource-intensive complex operations, thereby increasing overhead for message processing. Accordingly, a need exists for methods, systems, and computer program products for selectively performing GTT translations based on a message type without requiring the tracking of transactions.

SUMMARY

In one aspect of the subject matter disclosed herein, a method is disclosed for selectively performing global title translation based on message type at an SS7 network node. A message is received for global title translation. A message type of the received message is determined. Global title translation is selectively performed based on the determined message type.

In another aspect of the subject matter disclosed herein, a computer program product is disclosed that includes computer executable instructions embodied in a computer-readable medium for receiving a message for global title translation, determining a message type of the received message, and selectively performing global title translation based on the determined message type.

In another aspect of the subject matter disclosed herein, a system is disclosed for selectively performing global title translation based on message type. The system includes logic configured to receive a message for global title translation, logic configured to determine a message type of the received message, logic configured to selectively perform global title translation based on the determined message type.

In another aspect of the subject matter disclosed herein, a system is disclosed for selectively performing global title translation based on message type. A routing interface receives a message for global title translation. A message type detector determines a message type of the received message.

A global title translation function selectively performs global title translation based on the determined message type.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, or store, the program for use by or in connection with the instruction execution system, apparatus, or device. The computer-readable medium can be, for example but not limited to, an electronic, magnetic, optical, electromagnetic, or semiconductor system, apparatus or device. More specific examples (a non exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action.

Figure 1A:
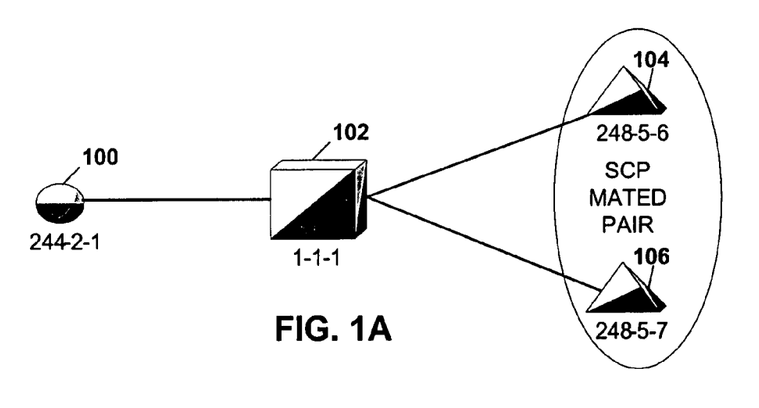
FIG. 1A is a block diagram illustrating a network including a signal transfer point having message type-based GTT functionality according to an aspect of the subject matter disclosed herein.

FIG. 1A is a block diagram illustrating a network including a signal transfer point having message-type-based GTT functionality according to an aspect of the subject matter disclosed herein. In FIG. 1A, a service switching point (SSP) 100 forwards messages via a signal transfer point (STP) 102 to either of a mated pair of SCPs 104 and 106. Messages are routed to STP 102 based on a destination point code (DPC) of 1-1-1 for STP 102 contained in the message transfer part (MTP) layer. An originating point code (OPC) of 244-2-1 corresponding to SSP 100 is also included in the MTP layer portion of the message.

STP 102 performs GTT processing on messages routed from SSP 100 by translating SCCP address information into a point code and subsystem number combination associated with a final destination. The message is then given to the MTP-3 layer with the translated point code so that it may be routed by MTP-3 to its final destination. The subsystem number is an address of a database or other subsystem component that may be accessed through an SCP, for example for processing a TCAP message.

STP 102 includes GTT tables with GTA address ranges that correspond to CgPA and/or CdPA addresses. The GTT tables include information for routing a message to an SCP. A mated application (MAP) table may also be employed for load sharing determinations between mated SCPs. For example, the Eagle® signal transfer point available from Tekelec of Calabasas, Calif., currently load shares post-GTT destinations through the use of a MAP table for final GTT. In one example, a user may define GTA=9194605500 in the GTT tables with a translation to PC=248-5-6. The user may then define a relationship in the MAP table between PCs 248-5-6 and 248-5-7. Accordingly, all traffic routed using GTA=9194605500 will conventionally be load-shared between the two PCs, without regard to message type.

One possible implementation of GTT and MAP tables as shown in Tables 1 and 2 below.

TABLE 1

GTT Table

| Starting GTA | Ending GTA | PC | SSN |
|---|---|---|---|
| 919460000 | 919469999 | 248-5-6 | 20 |
| 919560000 | 919569999 | 248-5-7 | 25 |

TABLE 2

Mated Application (MAP) Table

| PC/SSN | Mated PC/SSN | Rel Cost |
|---|---|---|
| 248-5-6/20 | 248-5-7/25 | 10 |
| 248-5-7/25 | 248-5-6/20 | 10 |

The MAP table includes PC/SSN combinations. A final GTT analysis of GTA 9194611000 and any other GTAs in the GTT table that translate to PC=248-5-6 and SSN 20 will result in a match in the MAP table showing a load sharing relationship between 248-5-6 SSN 20 and 248-5-7 SSN 25, and vice versa. The MAP table may also include a relative cost associated with each PC/SSN for use by the load sharing algorithm in load sharing determinations.

Figure 1B:
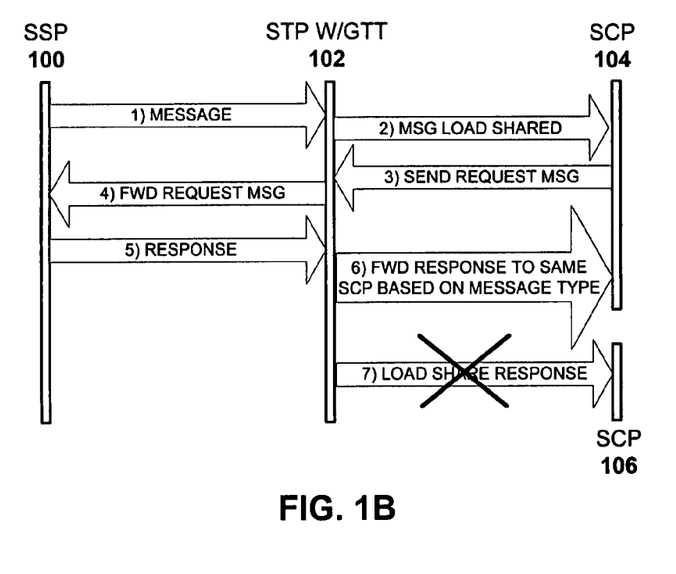
FIG. 1B is a signaling message diagram illustrating the bypassing of GTT and load-sharing by STP 102 illustrated in FIG. 1A.

Referring to FIG. 1B, a signaling diagram is shown to illustrate selectively performing GTT translation based on message type according to an aspect of the subject matter described herein. In line 1 of the message flow diagram, SSP 100 sends a message to STP 102. In line 2 of the message flow diagram, STP 102 performs GTT and it is assumed that the resulting point code corresponds to one of SCPs 104 and 106. Next, it is determined whether GTT and post-GTT load-sharing should be performed. Such a determination can be made by analyzing the message type. For example, if the message is a response or one of the other types enumerated below, load sharing should be bypassed. In this example, it is assumed that the message should be load shared. Accordingly, in line 2 of the message flow diagram, the message is load shared by performing a lookup in the MAP table and selecting the point code of SCP 104. The message is then sent to SCP 104 using a load sharing algorithm.

SCP 104 processes the message and determines that additional information is required to complete the transaction. For example, a personal identification (PIN) number may be required (e.g., need to be dialed-in) from the calling party. In lines 3 and 4 of the message flow diagram, a request message is sent back to SSP 100 via STP 102. SSP 100 responds by sending a response message including the requested information in line 5 of the message flow diagram. Here, if conventional GTT processing and load sharing were used, the message would be global title translated, load shared, and possibly sent to SCP 106 (incorrectly), as illustrated by line 7 of the message flow diagram. In this case, however, the response message is needed at SCP 104, as illustrated by line 6 of the message flow diagram.

According to an aspect of the subject matter described herein, STP 102 determines that the message is a response based on message type, such as TCAP package type, and routes the response message back to SCP 104 (the requesting SCP) based on the CdPA PC address. That is, if a point code is present in the SCCP CdPA field of the message, that point code is copied from the SCCP CdPA field to the MTP destination point code field. If the SCCP CdPA includes a global title address, rather than a point code, the global title address may be translated to the point code of SCP 106 using a table in STP 102 that is separate from the GTT and MAP tables. This approach provides compatibility with GSM implementations, which typically do not include the CdPA PC address in the message, but do include the CdPA GTA in the message.

Figure 2:
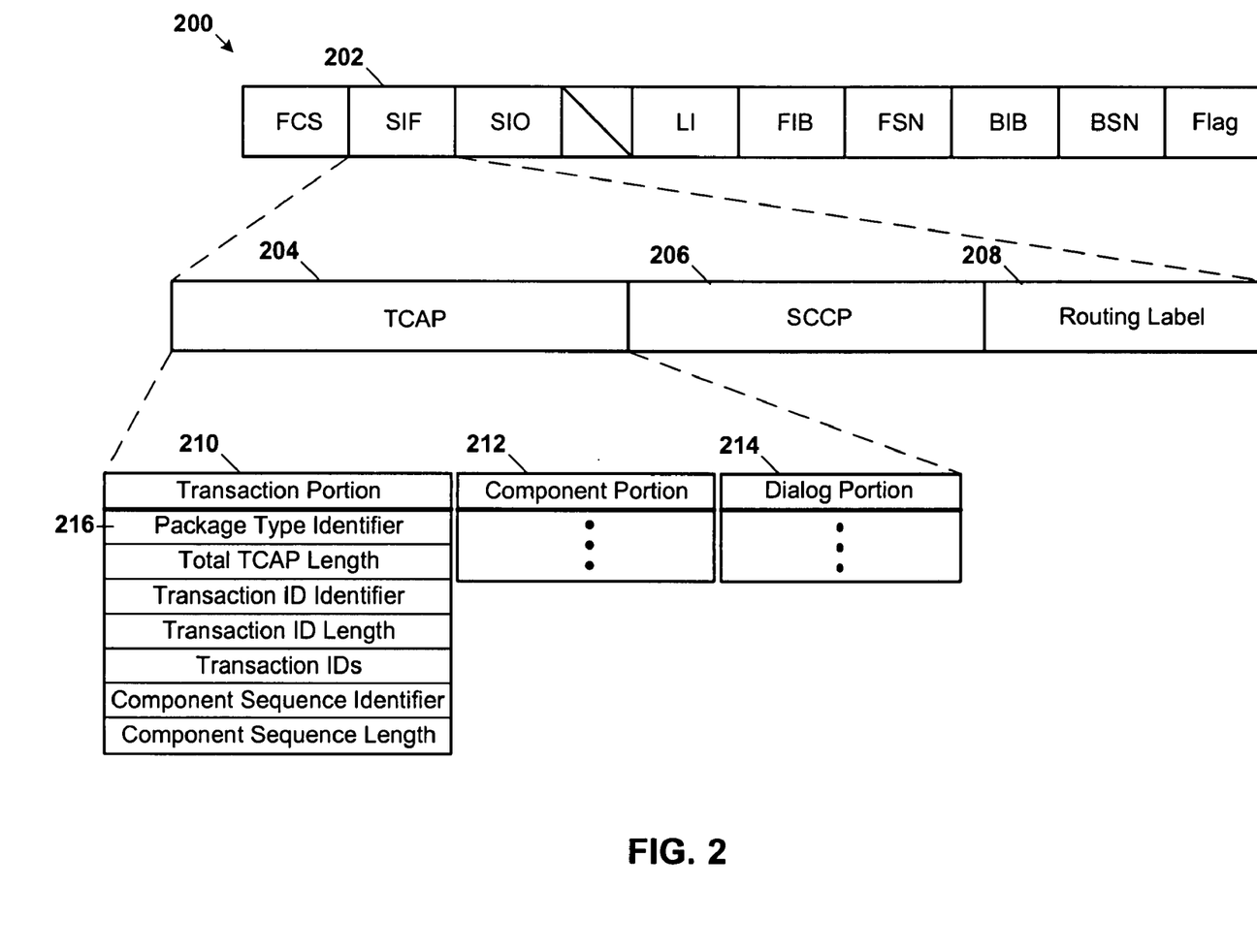
FIG. 2 is a schematic diagram illustrating a sample structure of an SS7 message signaling unit carrying transmission capabilities application part information.

A sample structure of an SS7 message signaling unit (MSU) 200 that carries TCAP information (e.g., a TCAP message) is illustrated in FIG. 2. Signaling information field (SIF) 202 of MSU 200 includes TCAP portion 204, SCCP portion 206, and MTP-3 portion 208. TCAP portion 204 is divided into three portions: a transaction portion 210, a component portion 212, and a dialog portion 214. Transaction portion 210 provides information necessary for a signaling point to route the component information to its destination. Component portion 212 receives component information from an operation protocol data unit (OPDU) received from a corresponding application. The OPDU contains the primitives and parameters necessary to invoke an operation on request services from another entity, such as a database query. Dialog portion 214 is used to identify the version of the transaction being used and provide security information and encryption is used on the transaction. Dialog portion 214 is an optional field within TCAP.

Transaction portion 210 indicates whether or not component portion 212 consists of a single transaction or multiple transactions, and alerts the corresponding recipient application as to how to process the message. A TCAP package type identifier 216, TCAP message length, transaction ID, and other parameters are provided to the recipient application to aid in processing the message. Package type identifier 216 indicates the type of TCAP message being forwarded. Table 3 below includes a list of package types and the associated bit values (A-H) used in package type identifier field 216 of transaction portion 210. Table 3 also includes an ongoing transaction indication that may be associated with each message type.

TABLE 3

TCAP Package Types

| TCAP Package Type | H | G | F | E | D | C | B | A | Ongoing Transaction |
|---|---|---|---|---|---|---|---|---|---|
| Unidirectional | 1 | 1 | 1 | 0 | 0 | 0 | 0 | 1 | No |
| Response | 1 | 1 | 1 | 0 | 0 | 1 | 0 | 0 | Yes |
| Query With Permission | 1 | 1 | 1 | 0 | 0 | 0 | 1 | 0 | Yes |
| Query Without Permission | 1 | 1 | 1 | 0 | 0 | 0 | 1 | 1 | Yes |
| Conversation With Permission | 1 | 1 | 1 | 0 | 0 | 1 | 0 | 1 | Yes |
| Conversation W/out Permission | 1 | 1 | 1 | 0 | 0 | 1 | 1 | 0 | Yes |
| Abort | 1 | 1 | 0 | 1 | 0 | 1 | 1 | 0 | Yes |

TCAP messages may be associated with ongoing transactions occurring between applications. In such a case, the message should be sent to the application associated with the ongoing transaction. For example, the SCP and subsystem that sends a request for more information to a remote endpoint has initiated a transaction and should receive the response to that request as part of the ongoing transaction. Accordingly, Table 3 may be used by STP 102 for determining whether a message is associated with an ongoing transaction, as will be described further below.

Messages that may be part of ongoing transactions include a response message, since a response is typically sent in response to a request sent by a requesting application that maintains state, such as, "waiting for response." In the case of a query, the response is used to return the requested data. In the case of a dialog between two applications, the response is the last transmission sent. Other TCAP message or package types that may be associated with ongoing transactions include query with permission, query without permission, conversation with permission, conversation without permission, and abort messages. A query with permission message is used to access information stored within a database and grants permission to the message recipient to end the transaction. If a dialog is to take place, a query may be followed by an information exchange between two applications. A conversation with permission message is sent after a query and is used to carry out a dialog between two applications and grants permission to the message recipient to end the transaction. An abort message is used to end a transaction, either by an originating entity or a user. A query without permission is generated when an application needs to enter into a transaction with a remote application. A conversation without permission is sent to prevent a remote application from ending a transaction before the originating application has completed the transmission of all its components. In each case, one or more applications may be actively tracking the state of a transaction. In contrast, a unidirectional message is sent in one direction only and does not require a return message (or response), and therefore is typically not related to ongoing transactions.

According to one aspect, ongoing transaction indication in a Table 3 may be based on a probability that a given message type is associated with an ongoing transaction. For example, if over a 50% of messages received of this message type correspond to an ongoing transaction, the message type can be considered to be associated with an ongoing transaction. This information may be static or change dynamically based on messages received. One example of message type and associated ongoing transaction indicators is shown in Table 3. Other message type to ongoing transaction indicator relationships are possible and such relationships may be operator configurable.

The first message in a given transaction may be load-shared and sent to any SCP capable of handling the transaction. Once this occurs, there is an ongoing transaction. Subsequent messages relating to the ongoing transaction should be sent to the SCP associated with the ongoing transaction. Referring again to FIG. 1B, the response message processed by STP 102 in line 5 may include a TCAP package type identifier 212 bit value of 11100100 corresponding to message type "response", as indicated in Table 3. Accordingly, STP 102 can use the TCAP package type identifier 212 to determine the message type and take appropriate steps to forward the response to the requesting SCP 104, rather than performing GTT or load sharing.

Applications that maintain state information for ongoing transactions may be referred to as "stateful applications" and applications that do not maintain state information for a transaction may be referred to as "stateless applications". According to another aspect of the subject matter disclosed herein, STP 102 may also include a stateful application table that includes the list of stateful applications by address and subsystem number. Table 4 provides an operator configurable list of applications that the operator wants global title translation to be performed based on message type. Table 4 may also include specific message types. When a message is received and the message type, called party address, and subsystem have been extracted from the message, the stateful application table may be checked to see if the message type, called party address, and subsystem are listed therein. If so, the message can be sent to the SCP and subsystem corresponding to the called party address/subsystem extracted from the message. Otherwise, the message is processed according to the GTT table and MAP table following normal procedures.

TABLE 4

Stateful Application Table

| CdPA PC/SSN | CdPA GTA/SSN | Package Type |
| --- | --- | --- |
| 248-5-6/20 | — | Response |
| 248-5-6/20 | — | Abort |
| 248-5-7/25 | 9195100045/25 | Response |
| 248-5-7/25 | 9195100045/25 | Abort |
| — | 9195100025/30 | Abort |
| — | 9195100025/30 | Response |

According to another aspect of the subject matter disclosed herein, the stateful application list table may include either or both of the CdPA PC/SSN and the CdPA GTA/SSN. Either (or both) called party address information may be extracted from the received message, depending on what called party address information is available in the message. For example, in a GSM implementation, the CdPA PC is typically not included with the message to provide space for other information. Instead, messages are routed based on the CdPA GTA. Accordingly, for GSM-related messages received, a lookup may be performed in the stateful application table based on global title address. Once the lookup is performed, a corresponding CdPA PC in Table 4 may be used for routing the message to the appropriate application. Alternatively, the CdPA PC may be obtained from another table in STP 102 or the message may be routed based on the CdPA GTA, where feasible. Other messages, however, may include a CdPA PC and subsystem number for the application associated with the transaction. Accordingly, a lookup may be performed in the stateful application table based on the CdPA PC and the message may be routed based on the CdPA PC.

Figure 3:
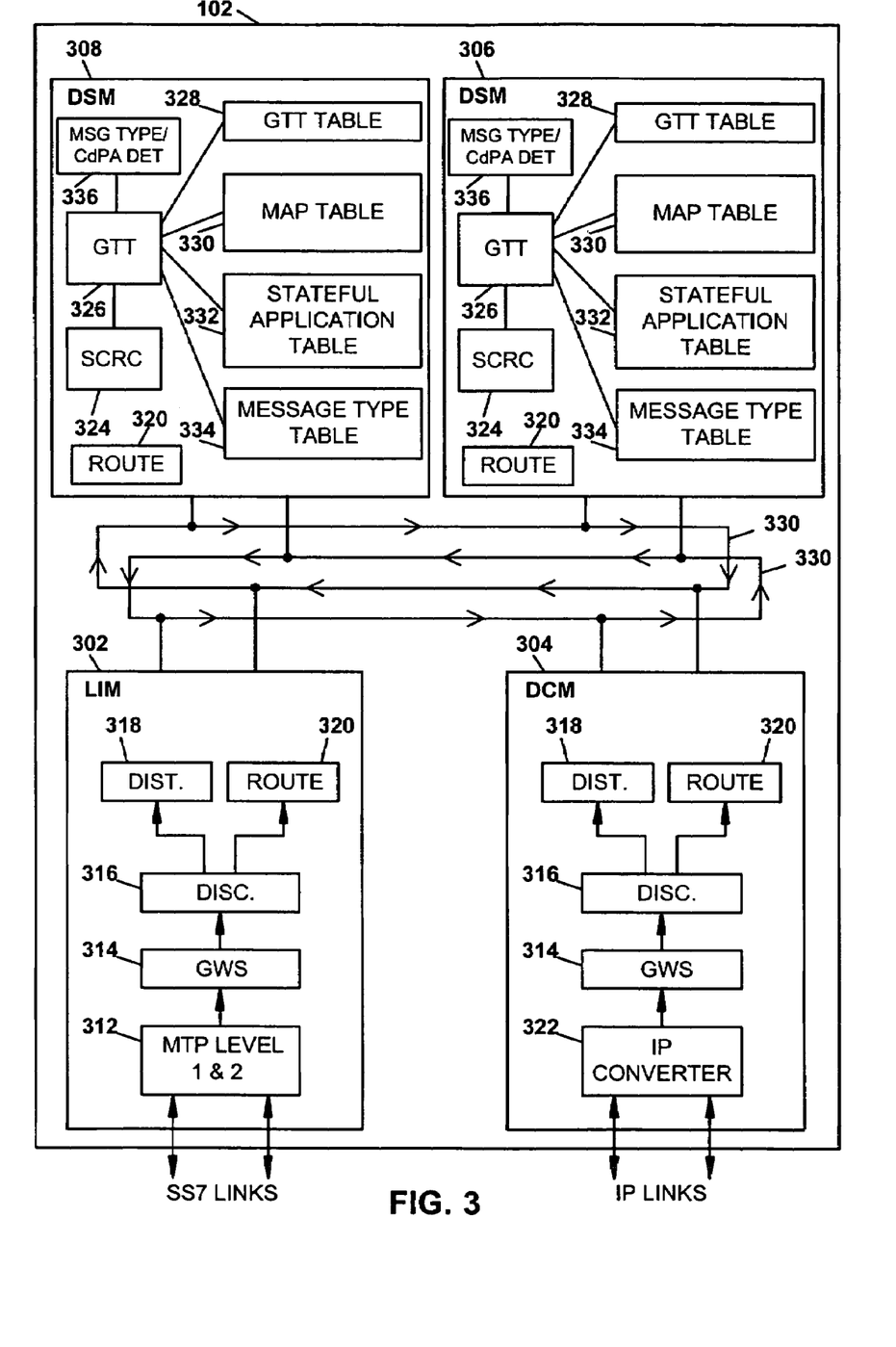
FIG. 3 is a block diagram illustrating an exemplary internal architecture for a signal transfer point having message-type-based GTT functionality according to an aspect of the subject matter disclosed herein.

FIG. 3 is a block diagram illustrating an exemplary internal architecture for STP 102 according to an aspect of the subject matter disclosed herein. In FIG. 3, STP 102 includes a plurality of internal processing modules 302, 304, 306, and 308. Each processing module 302, 304, 306, and 308 may include a printed circuit board having an application processor and a communications processor mounted thereon. The application processor may perform application level functions, such as message routing and card-specific functions. The communications processor may control communications with other processing modules via a counter-rotating dual-ring bus 310.

In the illustrated example, processing module 302 comprises a link interface module for sending and receiving SS7 messages via SS7 signaling links. Link interface module 302 includes an MTP level 1 and 2 function 312, a gateway screening function 314, a discrimination function 316, a distribution function 318, and a routing function 320. MTP level 1 and 2 function 312 performs MTP level 1 and 2 operations, such as error detection, error correction, and message sequencing. Gateway screening function 314 screens incoming SS7 messages based on the destination point code in each message to determine whether to allow the message into the network. Discrimination function 316 screens messages to determine whether the messages are addressed to STP 102 or to an external node. For messages addressed to STP 102, discrimination function 316 forwards the messages to distribution function 318 for distribution to the appropriate internal processing module. For messages requiring global title translation, discrimination function 316 forwards the messages to distribution function 318. Distribution function 318 then forwards the messages to one of DSMs 306 and 308 for GTT processing. Routing function 320 routes messages that are not addressed to STP 102 to the cards associated with the outbound signaling links corresponding to the point codes in the messages.

Processing module 304 comprises a data communications module for sending and receiving SS7 and/or IP telephony signaling messages over IP signaling links. In the illustrated example, data communications module 304 includes an IP converter 322 and functions 314 though 320 described with regard to link interface module 302. Functions 314-320 perform the same operations described with regard to link interface module 302. Hence, a description thereof will not be repeated herein. IP converter 322 performs the signaling operations necessary for sending and receiving SS7 messages over IP links. For example, IP converter 322 may include an Ethernet layer, an IP layer, a TCP, UDP, or SCTP layer, and an SS7 adaptation layer. The SS7 adaptation layer may be implemented using M3UA, M2PA, SUA, TALI, or other appropriate SS7 adapter layer, as described in the correspondingly named IETF Internet Drafts and RFCs.

Modules 306 and 308 are database services modules for performing GTT processing according to an aspect of the subject matter disclosed herein. Each database service module 306 and 308 includes a signaling connection routing controller (SCRC) 324 for receiving messages requiring SCCP services and determining the appropriate application for processing the messages. In the illustrated example, SCRC 324 may select GTT function 326 for messages requiring GTT, such as messages that include a route-on-global-title indication. GTT function 326 may access a GTT table 328, a MAP table 330, a stateful application table 332, a message type table 334, and a message type/CdPA detector 336. Stateful application table 332 and message type table 334 may correspond, for example, to Tables 4 and 3 above, respectively Message type/CdPA detector 336 determines a message type of a message currently being GTT processed. For example, message type detector 334 may analyze package type identifier 212 in transaction portion 206 of TCAP data 204 of the message. GTT function 326 may then determine, based on the message type, whether the message is associated with an ongoing transaction. For example, GTT function 326 may access message type table 334 to determine a corresponding ongoing transaction indicator associated with the determined message type.

Message type/CdPA detector 336 also determines the called party address information contained in the message. For example, a global title address or a called party point code, and corresponding subsystem number, may be extracted from the message. According to one aspect, the message type is determined first and the called party information is only determined if the message type is a message type that is determined to be associated with an ongoing transaction based on a lookup in message type table 334. In either case, if the message is determined to be associated with an ongoing transaction, the message is forwarded to routing function 320 for routing to the SCP and subsystem corresponding to the called party information.

According to another aspect of the subject matter described herein, once the message type and called party information is determined, stateful application table 332 is checked to determine if the message corresponds to a known stateful application. If the message is determined to be associated with a stateful application, the message is forwarded to routing function 320 for routing to the SCP and subsystem corresponding to the called party information.

When a message is not associated with a stateful application, normal GTT processing may proceed. For example, GTT function 326 performs a lookup in GTT table 328 to determine a destination point code and performs a lookup in MAP table 330 to perform GTT load sharing. After global title translation, GTT function 326 forwards the messages to routing function 320. Routing function 320 routes the messages to the signaling link associated with the point code determined by GTT function 326.

Figure 4:
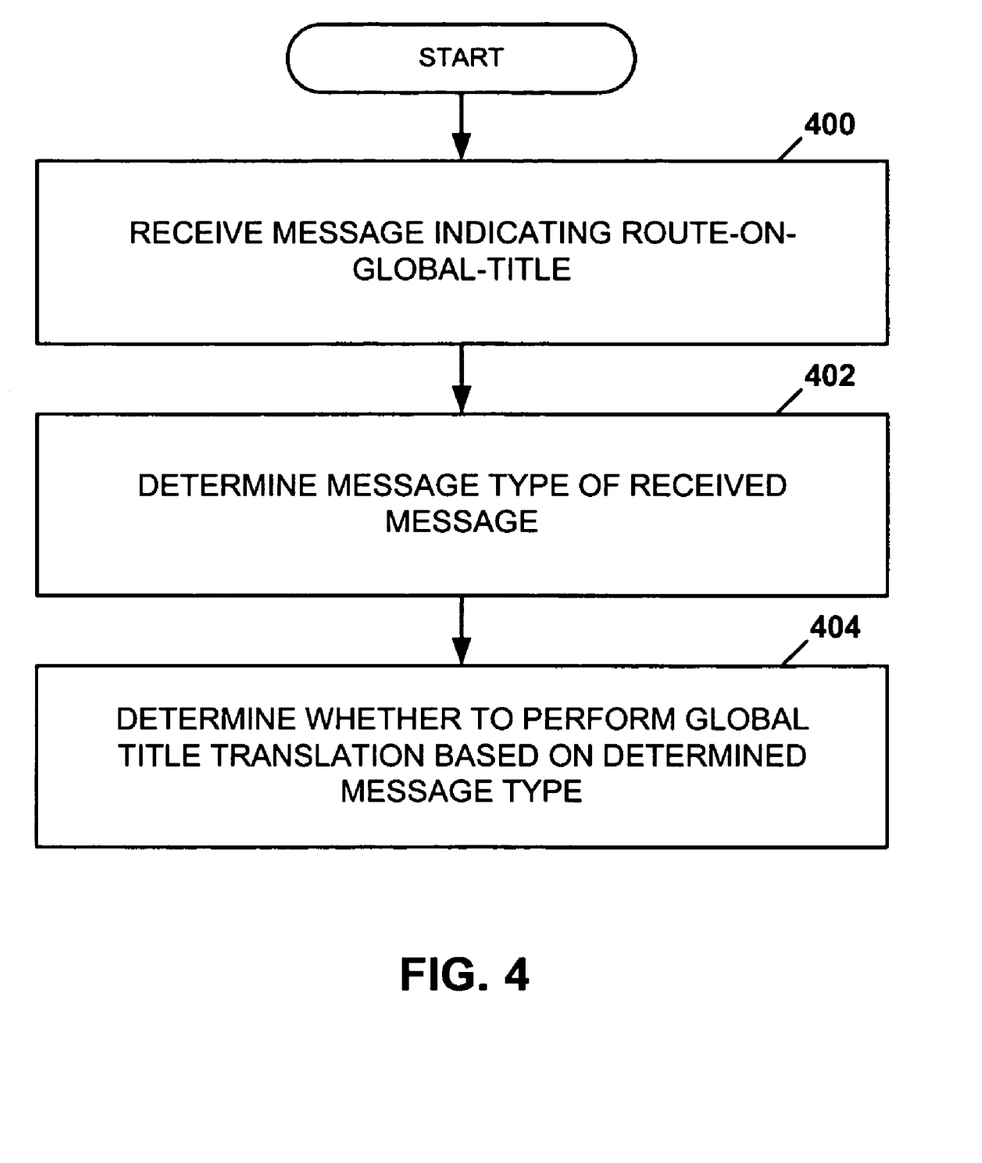
FIG. 4 is a flow diagram illustrating a method for selectively performing global title translation based on message type according to an aspect of the subject matter disclosed.

FIG. 4 is a flow diagram illustrating a method for selectively performing global title translation based on message type according to an aspect of the subject matter disclosed. In step 400, a message is received at an SS7 network, such as STP 102, node that includes a route-on-global-title indication. A message type of the received message is determined by message type/CdPA detector 336 in step 402. Next, it is determined whether to perform GTT based on the determined message type in step 404. For example, if the message type corresponds to an ongoing transaction, no GTT or load sharing is performed and the message is routed by routing function 320 according to called party information in the message. Otherwise, GTT is performed and the message is routed by routing function 320 based on routing information determined through GTT, including load sharing information obtained from MAP table 330.

Figure 5:
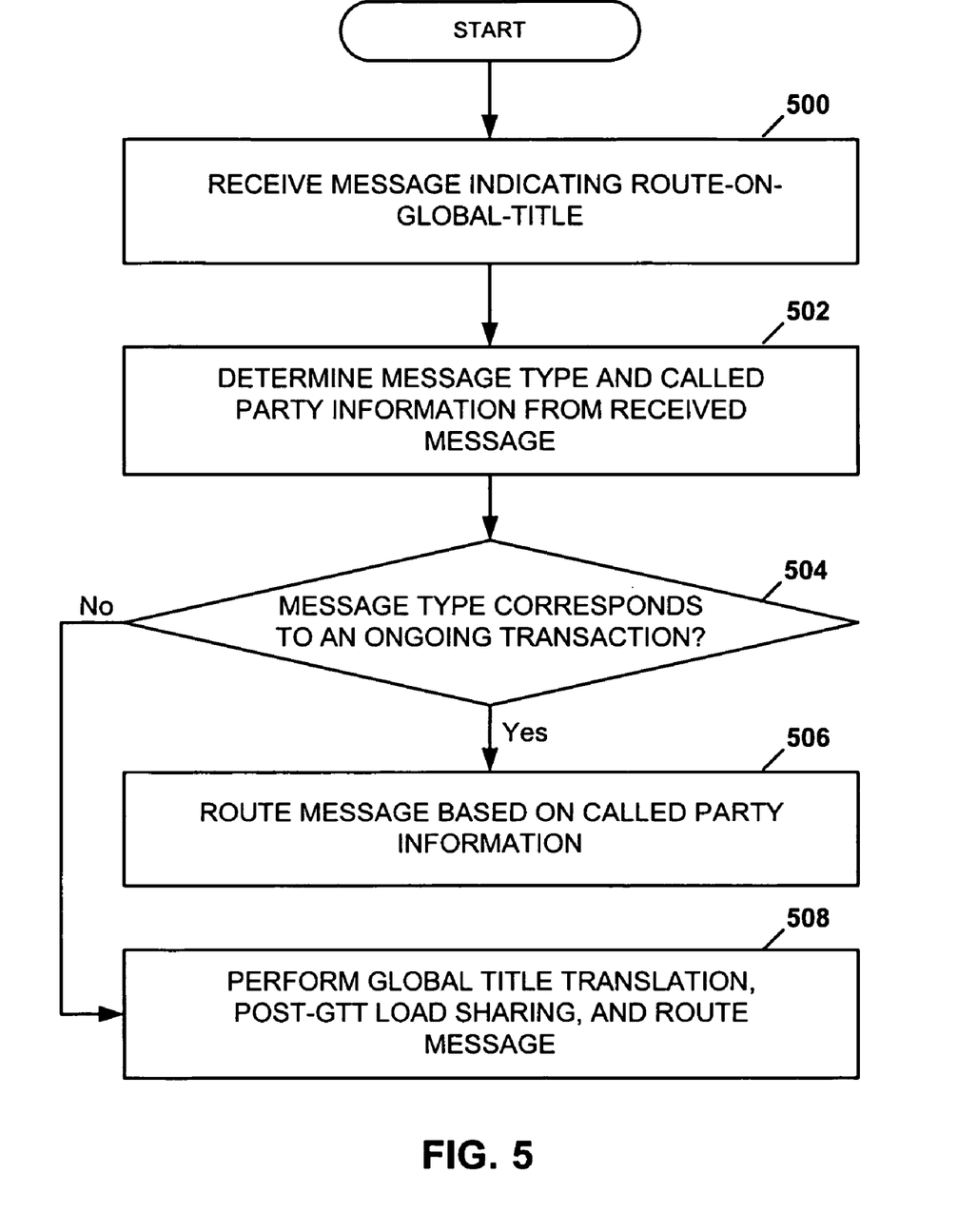
FIG. 5 if is a flow diagram illustrating a method for selectively performing global title translation based on message type according to another aspect of the subject matter disclosed.

FIG. 5 is a flow diagram illustrating a method for selectively performing global title translation based on message type according to another aspect of the subject matter disclosed. In step 500, a message is received at an SS7 network, such as STP 102, node that includes a route-on-global-title indication. A message type and called party information for the received message is determined by message type/CdPA detector 336 in step 502. In step 504, GTT function 326 determines whether the message type corresponds to an ongoing transaction. For example, GTT function 326 may perform a lookup in message type table 334, as discussed above. In response to determining that the message type corresponds to an ongoing transaction in step 504, the message is routed by routing function 320 based on the determined called party information in step 506. Here, the called party information may be a called party global title address or a called party point code and may include a subsystem number. If the called party information is a called party global title address, a corresponding point code may be determined by performing an additional lookup in a table and STP 102, such as stateful application table 332. In response to determining that the message type does not correspond to an ongoing transaction in step 504, global title translation and post-GTT load sharing is performed in step 508 and the message is routed by routing function 320 based on routing information determined through global title translation, including load sharing information obtained from MAP table 330.

Figure 6:
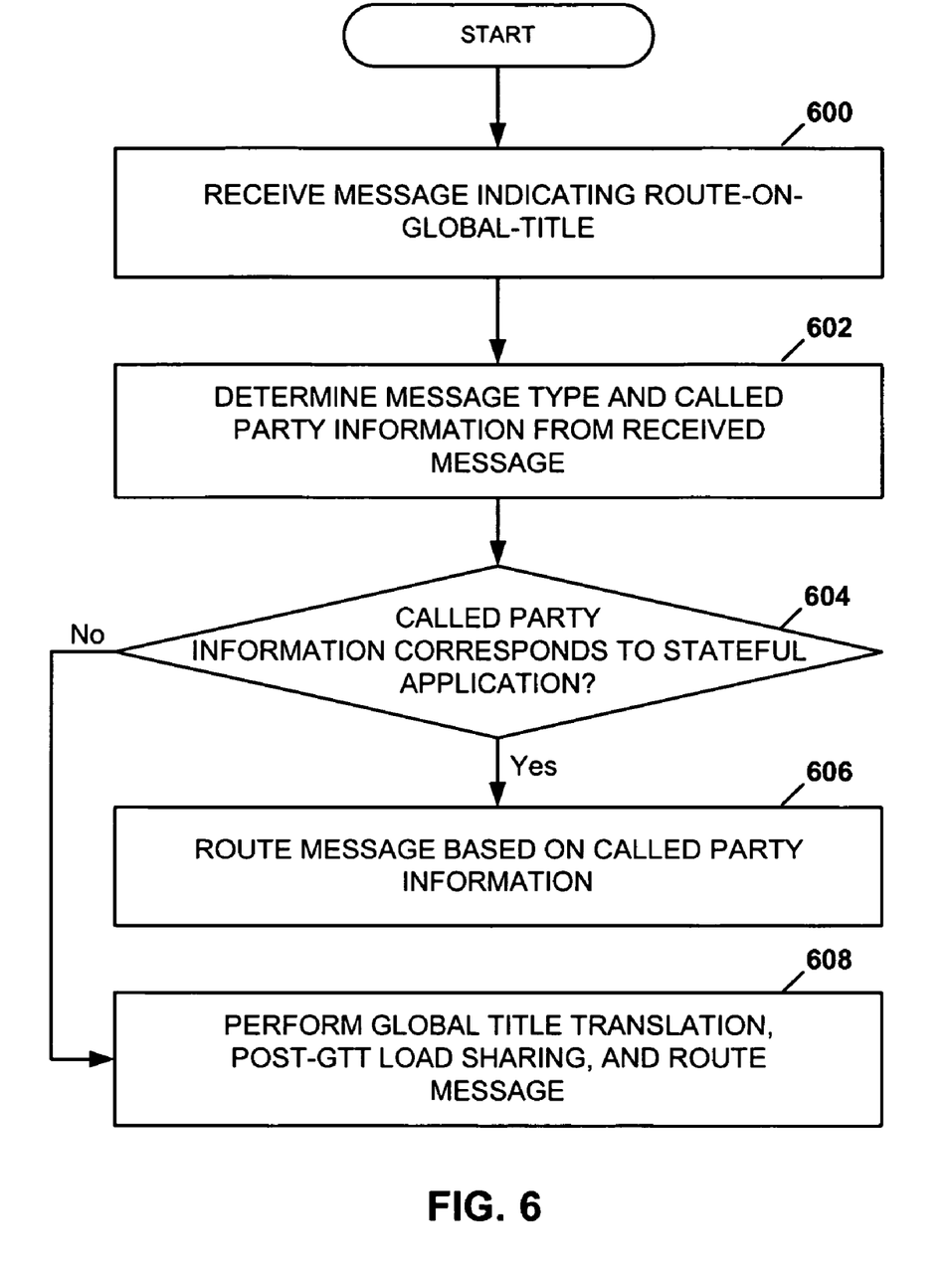
FIG. 6 is a flow diagram illustrating a method for selectively performing global title translation based on message type according to another aspect of the subject matter disclosed.

FIG. 6 is a flow diagram illustrating a method for selectively performing global title translation based on message type according to another aspect of the subject matter disclosed. In step 600, a message is received at an SS7 network, such as STP 102, node that includes a route-on-global-title indication. A message type and called party information for the received message is determined by message type/CdPA detector 336 in step 602. In step 604, GTT function 326 determines whether the called party information corresponds to a stateful application. For example, GTT function 326 may perform a lookup in stateful application table 332, as discussed above. The lookup may also be based on both called party information and a message type. In response to determining that the called party information corresponds to a stateful application in step 604, the message is routed by routing function 320 based on the determined called party information in step 606. Once again, the called party information may be a called party global title address or a called party point code and may include a subsystem number. If the message is a called party global title address, the corresponding called party point code may be determined from stateful application table 332 or another table in STP 102. In response to determining that the called party information does not correspond to a stateful application in step 604, global title translation and post-GTT load sharing is performed in step 608 and the message is routed by routing function 320 based on routing information determined through global title translation, including load sharing information obtained from MAP table 330.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for selectively performing global title translation based on message type, the method comprising:
    at an SS7 network node:
        (a) receiving a transaction capabilities application part (TCAP) message indicating route-on-global-title;
        (b) determining a message type of the received message, wherein the message type is indicated by the TCAP package type identifier field of the received message; and (c) determining whether to perform global title translation based on the determined message type.

2. The method of claim 1 wherein determining whether to perform global title translation based on the determined message type includes determining whether the message type is associated with an ongoing transaction.

3. The method of claim 2 wherein determining whether the message type is associated with an ongoing transaction includes checking a message type table having a message type and corresponding ongoing transaction indication.

4. The method of claim 1 comprising determining called party information from the received message.

5. The method of claim 4 wherein the called party information includes a called party address point code.

6. The method of claim 4 wherein the called party information includes a called party global title address.

7. The method of claim 4 wherein the called party information includes a subsystem number.

8. The method of claim 4 wherein determining whether to perform global title translation based on the determined message type includes routing the received message based on the called party information responsive to determining not to perform global title translation.

9. A method for selectively performing global title translation based on message type, the method comprising:

at an SS7 network node:

(a) receiving a message indicating route-on-global-title;

(b) determining a message type of the received message, wherein determining whether to perform global title translation based on the determined message type includes determining whether the message type is associated with an ongoing transaction and determining whether the message type is associated with an ongoing transaction includes checking a message type table having a message type and corresponding ongoing transaction indication, wherein the corresponding ongoing transaction indication is based on a probability that the message type is associated with an ongoing transaction; and (c) determining whether to perform global title translation based on the determined message type.

10. A method for selectively performing global title translation based on message type, the method comprising:

at an SS7 network node:

(a) receiving a message indicating route-on-global-title;

(b) determining a message type of the received message;

(c) determining called party information from the received message; and (d) determining whether to perform global title translation based on the determined message type, wherein determining whether to perform global title translation based on the determined message type includes determining whether the message type and the called party information are associated with a stateful application.

11. The method of claim 10 wherein determining whether the message type and the called party information are associated with a stateful application includes checking a stateful application table having called party information corresponding to stateful application indications.

12. The method of claim 11 wherein the corresponding stateful application indication includes a message type associated with a stateful application.

13. A computer program product comprising computer executable instructions embodied in a computer-readable medium for performing steps comprising:

at an SS7 network node:

(a) receiving a transaction capabilities application part (TCAP) message indicating route-on-global-title;

(b) determining a message type of the received message, wherein the message type is indicated by the TCAP package type identifier field of the received message; and (c) determining whether to perform global title translation based on the determined message type.

14. A system for selectively performing global title translation based on message type, comprising:

at an SS7 network node:

(a) logic configured to receive a transaction capabilities application part (TCAP) message indicating route-on-global-title;

(b) logic configured to determine a message type of the received message, wherein the message type is indicated by the TCAP package type identifier field of the received message; and (c) logic configured to determine whether to perform global title translation based on the determined message type.

15. A system for selectively performing global title translation based on message type, comprising:

at an SS7 network node:

(a) a signaling interface for receiving transaction capabilities application part (TCAP) messages indicating route-on-global-title;

(b) a message type detector for detecting a message type of each received message, wherein the message type is indicated by the TCAP package type identifier field of each received message; and (c) a global title translation function for determining whether to perform global title translation based on the determined message type.

16. The system of claim 15 wherein the message type detector includes a called party information detector for determining called party information from the received message.

17. The system of claim 16 wherein the called party information includes a called party address point code.

18. The system of claim 16 wherein the called party information includes a called party global title address.

19. The system of claim 16 wherein the called party information includes a subsystem number.

20. The system of claim 16 wherein the global title translation function provides routing information to the signaling interface for routing the received message based on the called party information responsive to determining not to perform global title translation.

21. A system for selectively performing global title translation based on message type, comprising:

at an SS7 network node:

(a) a signaling interface for receiving messages indicating route-on-global-title;

(b) a message type detector for detecting a message type of each received message; and (c) a global title translation function for determining whether to perform global title translation based on the determined message type and determining whether the message type is associated with a stateful application.

22. The system of claim 21 comprising a message type table having message types and corresponding ongoing transaction indications, wherein the global title translation function checks the message type table to determine whether the message type is associated with an ongoing transaction.

23. The system of claim 22 wherein corresponding stateful application indications in the message type table are based on a probability that the message type is associated with an ongoing transaction.

24. A system for selectively performing global title translation based on message type, comprising:
   at an SS7 network node:
   (a) a signaling interface for receiving messages indicating route-on-global-title;
   (b) a message type detector for detecting a message type of each received message, wherein the message type detector includes a called party information detector for determining called party information from the received message; and
   (c) a global title translation function for determining whether to perform global title translation based on the determined message type and determining whether the message type and the called party information are associated with a stateful application.

25. The system of claim 24 comprising a stateful application table having called party information and corresponding stateful application indications, wherein the global title translation function checks the stateful application table to determine whether the called party information corresponds to a stateful application.

26. The system of claim 25 wherein the stateful application table includes corresponding stateful application indications and associated message types indicating a stateful application.

* * * * *